June 12, 1928.　　　　　　　　　　　　　　　　　1,673,547
H. C. BAQUIE
RESILIENT WHEEL
Filed July 13, 1926

Inventor:
H. C. Baquie
his Attorney

Patented June 12, 1928.

1,673,547

UNITED STATES PATENT OFFICE.

HUBERT CHARLES BAQUIE, OF MELBOURNE, VICTORIA, AUSTRALIA.

RESILIENT WHEEL.

Application filed July 13, 1926, Serial No. 122,213, and in Australia March 30, 1926.

This invention relates to improvements in resilient wheels for motor cars and other road vehicles, and particularly to wheels of the type wherein the spokes comprise pistons arranged to slide within cylinders which contain cushioning bodies to absorb the road shocks imparted to the wheel.

The invention has been devised principally to provide greater resiliency in wheels of this character, and to provide improved shock absorbing means in the spokes and in the wheel rim. The invention is characterized by the use of shock-absorbers comprising inflatable envelopes of yielding material containing a compressible body, such as gas-charged balls or bodies suspended in a non-compressible mobile body, such as liquid in such manner that shocks imparted to the non-compressible body are evenly transmitted to and absorbed by the compressible body contained in the inflated envelopes.

Reference is now made to the accompanying drawings wherein:—

Figure 1:
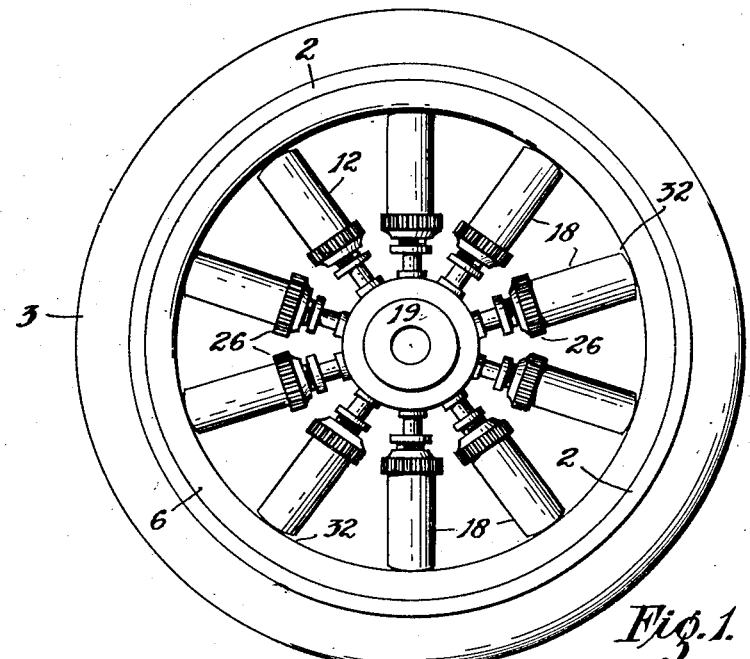
Figure 1 is a view in side elevation of the improved wheel.

In these views, 2 indicates the wheel rim which is preferably of channel shape and supports a non-puncturable tyre 3 of solid rubber or other resilient material. The rim is ordinarily constructed in two parts 4 and 5, the part 5 being detachably secured to the part 4 as by a screw threaded engagement to permit convenient assembly of the wheel parts and to facilitate removal and replacement of the tyre 3.

Formed on the wheel rim are two inwardly projecting flanges 6 forming an annular channel 7, within which shock-absorbers for the wheel rim are fitted. Each of these shock-absorbers comprises two telescopic cylinders 8 and 9, which may be of curved construction to correspond to the curvature of the wheel rim. The cylinder 8 is rigidly connected at its end to an abutment in the form of a block 10 secured in the channel 7 by screws 11, while the other cylinder 9 is connected to the outer end of a wheel spoke 12 engaged in the rim channel and is slidable over the exterior surface of said cylinder 8. Cushion members in the form of balls 13 formed of inflatable envelopes of yieldable material, such as rubber, inflated with a compressible body, such as nitrogen, ammonia, air, or other gas are arranged within the telescoped cylinders 8 and 9, and are suspended in a non-compressible mobile body, comprising liquid 14, such as glycerine, which evenly distributes the road shocks imparted to the wheel rim over the whole surface area of said inflated balls.

The telescoped cylinders 8 and 9 are preferably constructed having at their outer ends bosses or studs 15 which fit into sockets 16 formed in the ends of the spokes 12 and the blocks 10. These bosses and sockets serve to prevent displacement of the telescoped cylinders by severe shock imparted to the wheel under road travelling conditions.

Two shock-absorbers as described are provided between the ends of each pair of spokes 12, and are separated one from the other by the blocks 10 which may, if desired, be formed of rubber or resilient material to act as cushion buffers.

Each of the spokes 12 comprises a piston member 17 and a cylinder 18. The piston members 17 are preferably constructed of tubular metal to reduce weight, and are screwed at their inner ends into the wheel hub 19, while their outer ends are provided with piston-heads 20 which are slidable in the cylinders 18. The ends of said cylinders are arranged with extensions 21, which fit into the annular channel 7 in the wheel rim between the telescoped cylinders 8, 9. Rollers 22 or other devices are preferably fitted between the surfaces of the extensions 21 and the rim channel 7 to reduce friction between the parts.

Cushion members in the form of inflated envelopes or balls 23 similar to the balls 13 in the rim shock-absorbers are seated within the spoke cylinders 18 at the end of the piston heads to receive the thrust of the piston-heads 20, and these balls are similarly suspended in non-compressible mobile body, comprising a liquid 24 such as glycerine confined in the cylinders at the end of the piston heads and in which the inflatable bodies 23 are suspended. Packing rings 25 of rubber or leather may be fitted to the piston heads 20 to effect fluid-tight joints with the interior surfaces of the cylinders 18, and stuffing glands 26 of ordinary construction are employed at the ends of the spoke cylinders 18 to prevent escape of the liquid 24.

Any shocks imparted to the wheel structure are absorbed either by the telescopic shock absorbers in the wheel rim 2 or the resilient spokes 12, or by both. In every case, however, the shock is initially imparted to the non-compressible mobile body or liquid and is then transmitted to and absorbed by the suspended balls or compressible bodies. The function of the non-compressible mobile body is to evenly distribute the applied shock over the whole surface area of the inflated balls or compressible bodies to obtain satisfactory absorption and to ensure a quick recovery of the inflated balls immediately the shock has passed.

Under some travelling conditions, the wheel tyre 3 may receive a sudden short jolt or a series of almost continuous long jolts. Shocks of this kind are absorbed by the telescopic shock-absorbers in the wheel rim, the cylinder 9 then slidably moving over the cylinder 8 to cause the non-compressible mobile body to exert a compression force on the balls or compressible bodies 13. Any excessive or sudden movement of the cylinders 9 checked by the action of the non-compressible body 14.

In some cases when a heavy sudden jolt is imparted to the wheel rim, such as would cause dropping of the vehicle body, the primary impact is taken by the spokes 12. In this movement the piston-heads 20 slidably move in the cylinders 18 to cause the non-compressible body to exert a compression force upon the balls or compressible bodies 23.

The envelopes containing the compressible bodies 13 and 23, although not sufficiently strong in themselves to resist collapse under pressure, are, however when suspended in the non-compressible body, enabled to withstand intense pressures, which are equally distributed over the whole area of their surfaces.

Figures 2, 3:
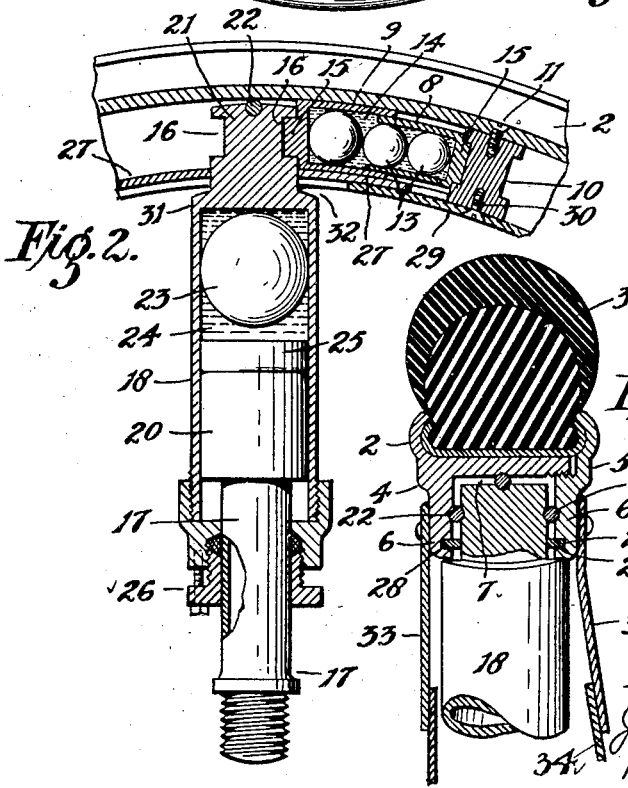
Figure 2 is a sectional view on an enlarged scale showing one of the wheel spokes and portion of the rim.
Figure 3 is a fragmentary cross-sectional view of the wheel as provided also with overlapping cover plates.

Fitted to each of the extensions 21 of the spoke cylinders 18 is a curved plate 27, which is slidable in guide grooves 28 in the rim flanges 6—see Figure 3. Cover plates 29 are secured by screws 30 to the blocks 10 and are arranged to slidably overlap the plates 27 to prevent ingress of dust or foreign matter to the wheel rim.

The shoulder portions 31 of the spoke-cylinders 18 are preferably of curved configuration, as is shown in Figure 2, to provide spaces 32 between the ends of the cylinders and the rim flanges 6, thereby facilitating movements imparted to said cylinders in either direction against the shock absorbers in the wheel rim.

Metal cover plates 33 are affixed to the rim flanges 6 and overlap similar plates 34 secured to the wheel hub 19. These plates 33 and 34 completely enclose the spokes 12 and the cylinders 18 and thus prevent the entrance of dust or other foreign matter, which would prejudice efficient operation of the integers of the wheel structure. The overlapping portions of said cover plates have a slidable engagement, and thus they do not in any manner affect the resilient action of the wheel.

What I do claim is:—

1. In a wheel, a hub, a series of spokes carried by said hub arranged with piston heads, a wheel rim, cylinders projecting inwardly from said wheel rim in which the piston heads of the spokes slidably engage, a non-compressible mobile body in said cylinders at the end of the piston heads, and compressible bodies in suspension in the mobile body in the cylinders.

2. In a wheel, a rim arranged with a channel about the inner circumference, a hub, a series of spokes carried by said hub arranged with piston heads, cylinders engaging in the rim channel slidably fitted over said piston heads, non-compressible mobile bodies contained in said cylinders at the end of the piston heads, inflatable envelopes containing a compressible body suspended in said mobile bodies in the cylinders, and shock absorbers arranged in the rim channel at opposite sides of the cylinder part in the rim channel, comprising telescoping cylinders carrying a non-compressible mobile body therein and inflatable envelopes containing a compressible body suspended in the mobile body.

3. A wheel as claimed in claim 2, wherein the telescoping cylinders of the shock absorbers are interposed between the cylinder parts in the rim channel and abutment blocks rigidly secured in the rim channel.

4. In a wheel, a rim arranged with a channel on the inner circumference and for mounting of a tire on the outer circumference, a hub, a series of spokes carried by said hub arranged with piston heads, cylinders having a part for engagement in the rim channel slidably fitted over said pistons, a non-compressible mobile body confined within the cylinders at the end of the piston heads, inflatable envelopes containing a compressible mobile body in suspension in the non-compressible mobile bodies, blocks secured in the rim channel in interposed relation to the cylinder parts engaging therein, telescoping cylinders containing a non-compressible mobile body in the rim channel interposed between the cylinder extensions and blocks, and inflatable envelopes containing a compressible mobile body in suspension in the non-compressible mobile body in the telescoped cylinders.

In testimony whereof I affix my signature.

HUBERT CHARLES BAQUIE.